US007299339B2

(12) United States Patent
Ramesh

(10) Patent No.: US 7,299,339 B2
(45) Date of Patent: Nov. 20, 2007

(54) SUPER-RECONFIGURABLE FABRIC ARCHITECTURE (SURFA): A MULTI-FPGA PARALLEL PROCESSING ARCHITECTURE FOR COTS HYBRID COMPUTING FRAMEWORK

(75) Inventor: Tirumale K. Ramesh, Centreville, VA (US)

(73) Assignee: The Boeing Company, Chicago, IL (US)

( * ) Notice: Subject to any disclaimer, the term of this patent is extended or adjusted under 35 U.S.C. 154(b) by 281 days.

(21) Appl. No.: 10/931,068

(22) Filed: Aug. 30, 2004

(65) Prior Publication Data
US 2006/0095716 A1    May 4, 2006

(51) Int. Cl.
*G06F 12/08* (2006.01)
(52) U.S. Cl. .............................. 712/24; 712/10; 712/11
(58) Field of Classification Search .................. 712/24, 712/10, 11
See application file for complete search history.

(56) References Cited

U.S. PATENT DOCUMENTS

| 5,197,130 | A | * | 3/1993 | Chen et al. ..................... 712/3 |
| 5,233,539 | A | * | 8/1993 | Agrawal et al. ............... 716/16 |
| 5,684,980 | A | * | 11/1997 | Casselman ................... 703/23 |
| 6,026,459 | A | | 2/2000 | Huppenthal |
| 6,076,152 | A | | 6/2000 | Huppenthal et al. |
| 6,247,110 | B1 | | 6/2001 | Huppenthal et al. |
| 6,295,598 | B1 | | 9/2001 | Bertoni et al. |
| 6,339,819 | B1 | | 1/2002 | Huppenthal et al. |
| 6,356,983 | B1 | | 3/2002 | Parks |
| 6,434,687 | B1 | | 8/2002 | Huppenthal |
| 6,594,736 | B1 | | 7/2003 | Parks |
| 6,627,985 | B2 | | 9/2003 | Huppenthal et al. |
| 6,684,318 | B2 | * | 1/2004 | DeHon et al. ................. 712/15 |
| 2003/0065904 | A1 | * | 4/2003 | Burns et al. .................. 712/11 |
| 2004/0003201 | A1 | * | 1/2004 | Burns et al. .................. 712/11 |

OTHER PUBLICATIONS

"SRC Technology Overview", http://www.srccomp.com/Technology.htm, © Oct. 1999-2004 SRC Computers, Inc., Colorado Springs, CO, USA.
Barat et al., "Low Power Coarse-Grained Reconfigurable Instruction Set Processor"; http://www.elis.rug.ac.be/wog/edegem2003/barat.pdf, (2003).
Virtual Java/FPGA Interface for Networked Reconfiguration, http://www.imec.be/reconfigurable/pdf/ASPDAC_01_virtual.pdf, (2000).

* cited by examiner

*Primary Examiner*—Alford Kindred
*Assistant Examiner*—Vincent Lai
(74) *Attorney, Agent, or Firm*—Ingrassia Fisher & Lorenz, P.C.

(57) ABSTRACT

A field programmable gate array includes a virtual bus interface that receives a control word from a host processor over a standard I/O bus. A configurable very long instruction word (VLIW) controller receives the control word via virtual bus interface signals mapped from the virtual bus interface. A reconfigurable communication and control fabric controls the data paths and programming modes of single instruction-multiple data (SIMD) processing element cells. The configurable VLIW controller has an interface with the reconfigurable communication and control fabric. SIMD processing element cells are controlled by the configurable VLIW controller through the reconfigurable communication and control fabric via the interface.

23 Claims, 10 Drawing Sheets

| VIRTUAL BUS INTERFACE (VBI) SIGNALS | | |
|---|---|---|
| G<br>(g1) FPGA Address<br>(g2) Access_mode<br>(g3) Write_fp<br>(g4) Read_fp<br>(g5) Status_fp | H<br>(h1) Time_En_fp<br>(h2) Suspend_fp<br>(h3) Reset_fp<br>(h4) Stop_fp<br>(h5) Select_fp | I<br>(i1) DMA_Req_fp<br>(i2) DMA_Grant_fp<br>(i3) DMA_Counter<br>(i4) DMA_Address<br>(i5) DMA_Start |
| A (a1) signal_port (a2) signal_config (a3) L_signal (a4) H_signal (a5) S_signal<br>(a6) B_signal | | |
| B (b1) fifo_port (b2) q_fifo (b3) d_fifo (b4) s_fifo (b5) h_fifo | | |
| C (c1) bit_port | | |
| D 64-bit FPGA Data | | |
| L_signal=>64-bit, H_signal=>32-bit, S_signal=>16-bit, B_signal=>8-bit<br>a2=1 data port, a2=0 control port<br>q_fifo-256 bit wide (store 4, 64 bit data sample)-1 FIFO<br>d_fifo-128 bit wide (store 4, 32 bit data sample)-2 FIFO<br>s_fifo-64 bit wide (store 4, 16 bit data sample)-4 FIFO<br>h_fifo-32 bit wide (store 4, 8 bit data sample)-8 FIFO | | |

SUPER-RECONFIGURABLE FABRIC ARCHITECTURE (SURFA): A MULTI-FPGA PARALLEL PROCESSING ARCHITECTURE FOR COTS HYBRID COMPUTING FRAMEWORK

BACKGROUND OF THE INVENTION

The present invention generally relates to computer architectures. More particularly, the present invention relates to a parallel processing computer architecture using multiple field programmable gate arrays (FPGA) for a commercial off-the-shelf (COTS) hybrid-computing framework.

High performance computer systems having flexibility for providing user configuration are attracting wide spread interest, and in particular, in the defense and intelligence communities. Increasing silicon density in field programmable gate arrays (FPGAs) is attracting many users to build parallel processing architectures such as single instruction-multiple data (SIMD) architectures using coarse-grained processing arrays in FPGAs. Signal and image processing applications are well fit to parallel data structures handled by multiple data architectures. Even though digital signal processors (DSPs) are maturing to use more SIMD or very long instruction word (VLIW) architecture elements within a processor, still there is a compelling argument against using DSPs for high performance computer systems due to their inflexibility and compiler generated overhead. So, more and more solution developers are turning towards FPGA based high performance systems.

A major problem faced by these solution developers is to accelerate compute intensive functions in these high-data processing applications—such as wavelet transformation, high performance simulation, and cryptography—by executing the functions in hardware. Many compute intensive functions have regular data structures that are highly amenable to data parallelism and work well with traditional SIMD parallel processing techniques. With growing silicon component density in FPGAs, it is becoming more desirable to implement SIMD using FPGAs.

Another important problem faced by solution developers is the ability to make the solution independent of any particular commercial programmable hardware board vendor. Input/output (I/O) is still a bottleneck to achieving high overall system throughput performance. Fast data transfer is required and most importantly the interoperability of systems across different I/O standards is required. Currently, there are various I/O and switch fabric standards in place—such as PCI, PCI-X, PCI-Express, Infiniband, and RapidIO, for example—and new standards may emerge in the future. In essence, what is needed is a means to map from the commercial standard I/O buses—such as those noted—to a single, universal bus and to build application glue to a single, universal memory port. With rapid requirements changes and technology development, adaptability of a solution is required to protect investment in the solution. As systems have to be interoperable capable with other systems in the future, a solution is needed for connecting heterogeneous high performance computing systems and smart sensors. A further consideration is that a solution can adapt itself to address critical needs of defense applications running on next generation embedded distributed systems.

As can be seen, there is a need for a solution to the technical problem of improving high performance for very computation-intensive, high data stream applications over conventional high performance servers or host machines. There is also a need for a solution to provide support as a "super hardware accelerator" for servers and other host machines.

SUMMARY OF THE INVENTION

In one embodiment of the present invention, a system includes: a configurable very long instruction word controller that receives a control word from a host processor; a reconfigurable communication and control fabric having a very long instruction word interface to the configurable very long instruction word controller; and a single instruction-multiple data processing element cell controlled by the configurable very long instruction word controller through the reconfigurable communication and control fabric via the very long instruction word interface.

In another embodiment of the present invention, a reconfigurable communication and control fabric has interfaces to a single instruction-multiple data processing element cell, a configurable very long instruction word controller, and a floating-point unit. The reconfigurable communication and control fabric includes: an inter-chip communication module with a "v4" interface to the configurable very long instruction word controller; a data memory controller having a "v6" interface to the configurable very long instruction word controller; and an I/O controller with a "cd" interface to the data memory controller, an interface to the inter-chip communication module, and a "v5" interface to the configurable very long instruction word controller.

In still another embodiment of the present invention, a single instruction-multiple data processing element cell includes: a multiple number of processing elements and a fine grain reconfigurable cell having a fine grain reconfigurable cell controller interface to each of the processing elements.

In yet another embodiment of the present invention a virtual bus interfaces to a super reconfigurable fabric architecture module. The virtual bus interface includes a virtual memory port that maps a standard bus protocol to virtual bus interface signals provided between the virtual bus interface and the super reconfigurable fabric architecture module.

In a further embodiment of the present invention, a field programmable gate array includes a virtual bus interface that receives a control word from a host processor over a standard I/O bus; a configurable very long instruction word controller that receives the control word via virtual bus interface signals from the virtual bus interface; a reconfigurable communication and control fabric wherein the configurable very long instruction word controller has a very long instruction word interface "v" with the reconfigurable communication and control fabric; and a single instruction-multiple data processing element cell controlled by the configurable very long instruction word controller through the reconfigurable communication and control fabric via the very long instruction word interface "v".

In a still further embodiment of the present invention, a method for parallel processing includes operations of: interconnecting a single instruction-multiple data processing element cell through a reconfigurable communication and control fabric to a configurable very long instruction word controller; and configuring the configurable very long instruction word controller via a control word from a host processor so that the configurable very long instruction word controller controls processing in the single instruction-multiple data processing element cell, and the configurable very long instruction word controller controls communication and control in the reconfigurable communication and control fabric.

These and other features, aspects and advantages of the present invention will become better understood with reference to the following drawings, description and claims.

BRIEF DESCRIPTION OF THE DRAWINGS

FIG. 6 is a chart providing an overview of virtual bus interface signals in accordance with one embodiment of the present invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a computer architecture referred to herein as super-reconfigurable fabric architecture. Super-reconfigurable fabric architecture can provide a major high performance reconfigurable platform building block supporting a hybrid-computing framework. As systems are required to become interoperable capable with other systems in the future, super-reconfigurable fabric architecture can facilitate connecting heterogeneous high performance computing systems and smart sensors. Super-reconfigurable fabric architecture can adapt itself to address critical needs of defense applications running on next generation embedded distributed systems.

Super-reconfigurable fabric architecture can provide a scaleable and highly reconfigurable system solution using multiple-field programmable gate arrays (FPGAs). The super-reconfigurable fabric architecture has been developed exploiting parallel processing techniques. A major problem solved by super-reconfigurable fabric architecture is to accelerate computation—intensive functions in high-data processing applications—such as wavelet transformation, high performance simulation, and cryptography—by executing the functions in hardware using a unique combination of coarse grain FPGA architecture, parallel processing techniques and a reconfigurable communication and control fabric (RCCF)—such as RCCF shown in FIGS. 1 and 4. Computation-intensive functions generally have regular data structures that are highly amenable to data parallelism and work well with traditional single instruction-multiple data (SIMD) parallel processing techniques. Increasing component density in FPGAs provides feasibility to implement SIMD processing using an array of coarse-grain processing elements in FPGAs. Using a high density FPGA, one embodiment of the invention provides a scalable FPGA reconfigurable architectural capability with provision to program SIMD elements, multiple SIMD elements or VLIW (very long instruction word) elements.

Figure 10:
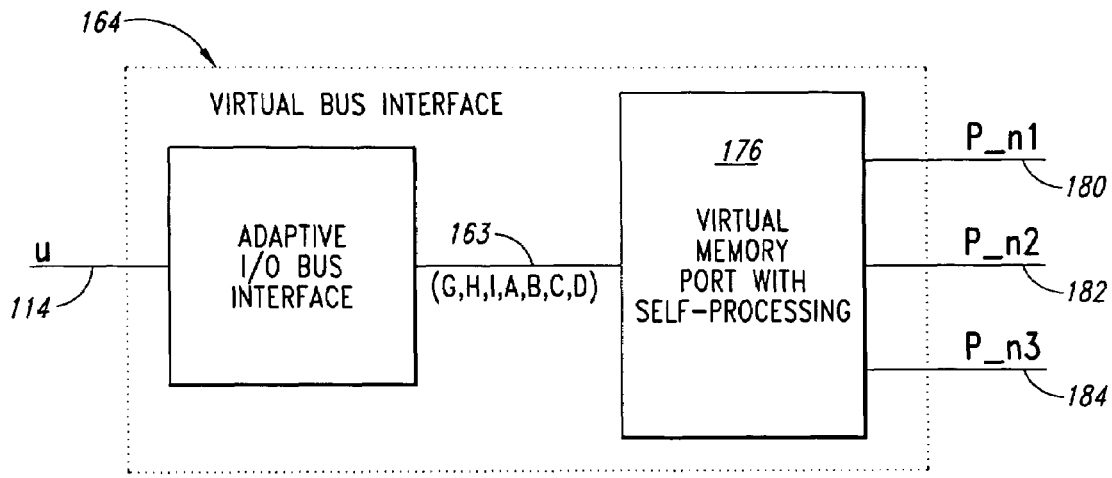
FIG. 10 is a system block diagram showing detail for an example implementation for a virtual bus interface as shown in FIGS. 4 and 7.

Another major problem solved by super-reconfigurable fabric architecture is the ability to provide processing solutions that are independent of the commercial programmable hardware board vendor. Using a virtual bus interface (VBI)—such as VBI shown in FIGS. 4, 7, and 10—all communication to the hardware is mapped to an on-chip memory. With this approach, application ports need only communicate through these virtual memory ports. In essence, what is provided is a plug-in to map from the commercial standard I/O buses—such as PCI, PCI-X, PCI-Express, Infiniband, and RapidIO, for example—to the virtual bus and build application glue to the virtual memory port. In one embodiment of the present invention, this virtual bus interface and associated memory port architecture may be built into the reconfigurable communication and control fabric—RCCF—of super-reconfigurable fabric architecture providing a single, universal bus interface and associated memory port architecture.

In general, super-reconfigurable fabric architecture provides a solution to technical problems of improving performance for very computation-intensive, high data stream applications over conventional high performance servers or host machines and of providing support as a "super hardware accelerator" for servers and other host machines.

Figure 2:
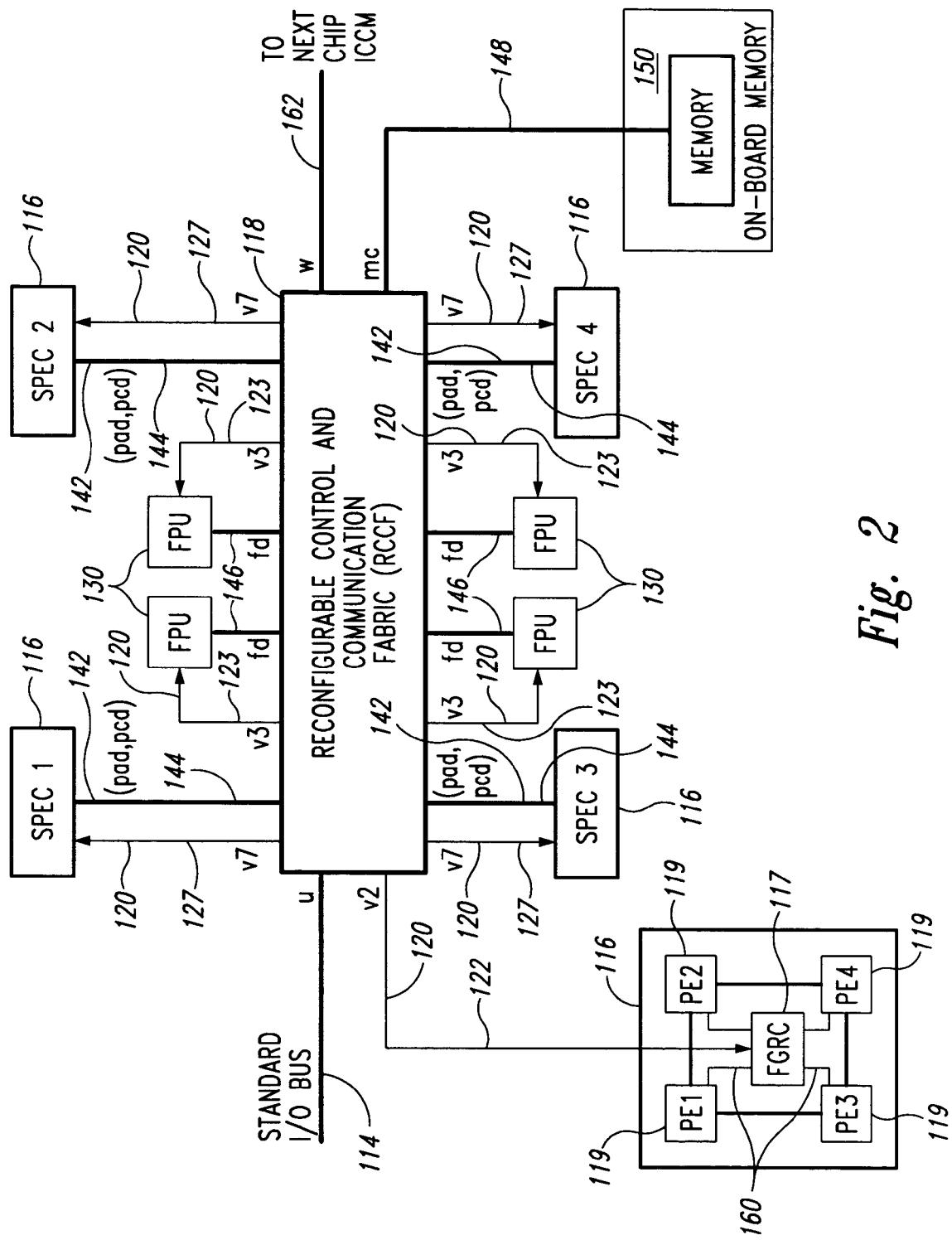
FIG. 2 is a system block diagram showing a detail of the SPEC and RCCF subsystems shown in FIG. 1.

One embodiment differs, for example, from a prior art computer architecture known as Unified Computing Architecture in that specific MAP® processors within "Direct Execution Logic" (DEL) are exploited only with FPGAs programmable logic devices (PLD)s and the architecture essentially shifts the software-directed processors area to microprocessors (uP), application specific integrated circuits (ASIC)s, and digital signal processors (DSP)s within "Dense Logic Device" (DLD). The Unified Computing Architecture programming environment can provide either exclusive (DEL) access or implicit fixed-architecture (DLD) access. So, from a general application development point of view, the application program code needs to state explicitly to launch on the DEL. One embodiment of the present invention may differ by launching a high-level object to FPGA when recognized with service availability. This makes architectures using the super-reconfigurable fabric architecture highly versatile as more resources can be added across chips, boards and even systems across backplanes. Super-reconfigurable fabric architecture can provide a generic platform with a group of acceleration resources that can be mapped to FPGAs, ASICs with some programmable cores, and any other special purpose processors. A major difference between super-reconfigurable fabric architecture and DEL is that a DEL is explicit access of FPGA at a much lower level (fine-grain). Super-reconfigurable fabric architecture is a higher-level defined hybrid architecture on which applications are mapped. Super-reconfigurable fabric architecture is transparent to the object mapping from a high-level application code. Also, super-reconfigurable fabric architecture uses a VLIW emitted control as further described below. The flexibility of a generic super-reconfigurable fabric architecture is an added advantage and the FPGA mapping is a combination of coarse-grain (super-reconfigurable fabric architecture multiple processors) and fine-grain reconfigurable cells (FGRC)—such as shown in FIG. 2.

Figure 1:
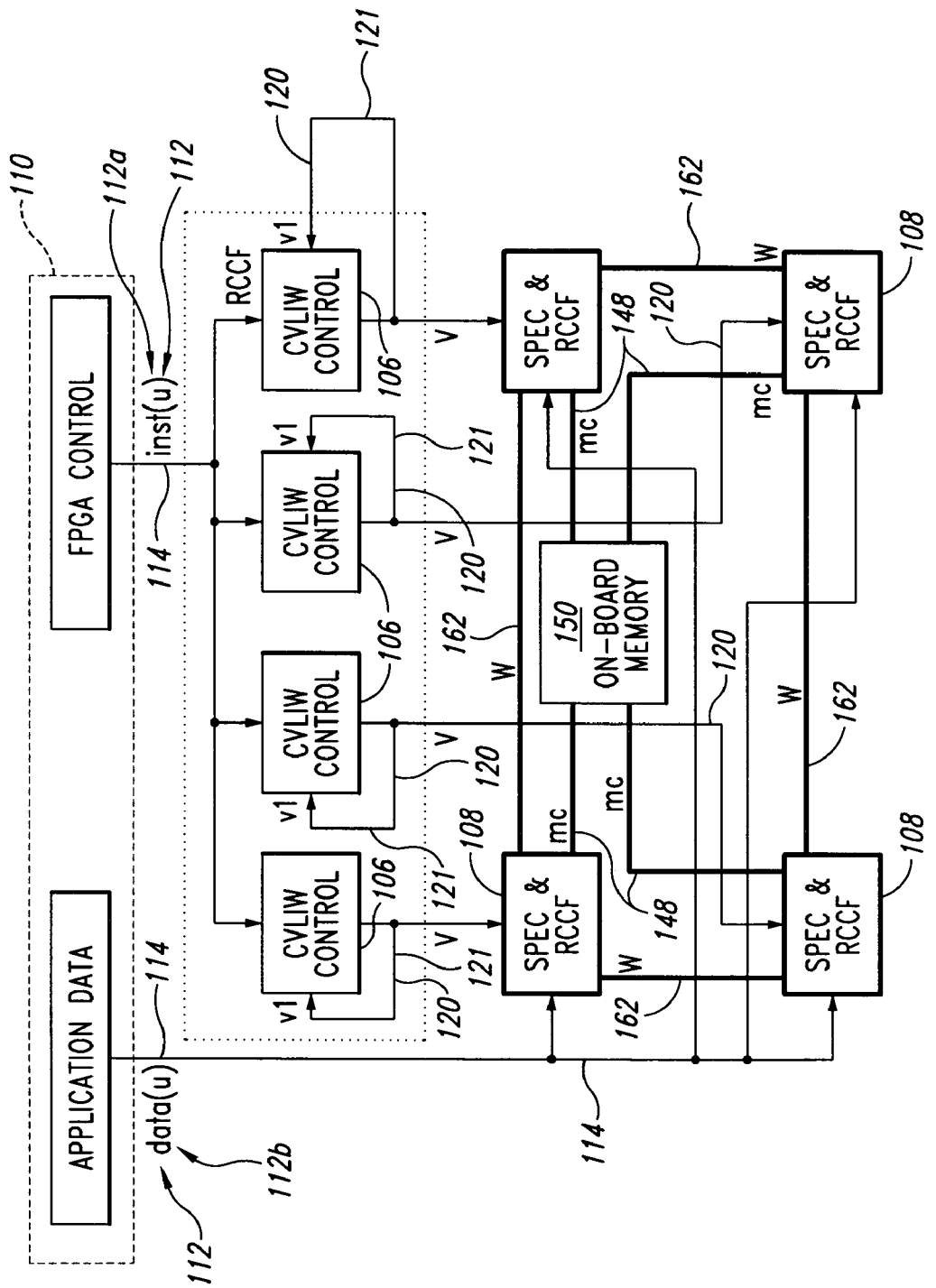
FIG. 1 is a system block diagram of super-reconfigurable fabric computer architecture in accordance with one embodiment of the present invention.
Figure 4:
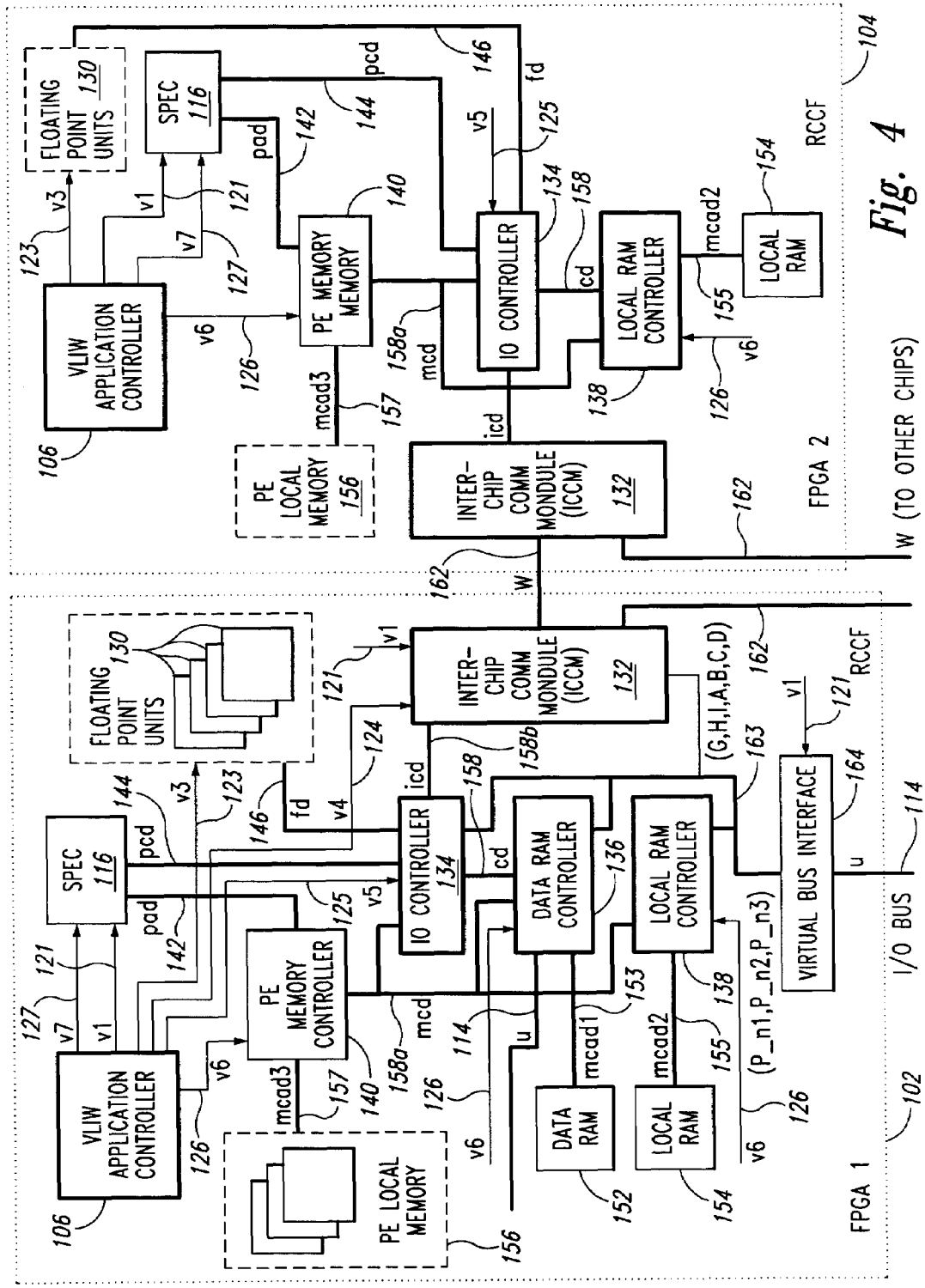
FIG. 4 is a detailed system block diagram of a super-reconfigurable fabric computer architecture showing one example of distribution of system modules among multiple FPGA chips in accordance with an embodiment of the present invention.

FIG. 1 illustrates system 100 embodying a super-reconfigurable fabric architecture (SuRFA) in accordance with one embodiment of the present invention. Super-reconfigurable fabric architecture may be considered to be a hybrid architecture that combines coarse-grain field programmable gate array architecture with SIMD and multiple SIMD (MSIMD) coupled parallel processing techniques providing temporal programmability of an array of simple coarse-grain processing elements and fine-grain FPGA cells within a multi-FPGA platform. For example, FIG. 4 shows an example distribution of system modules among two FPGAs, FPGA 102 and FPGA 104. Super-reconfigurable fabric architecture can serve as a super hardware accelerator to port software executable objects in hardware.

FIG. 1 illustrates a four-chip super-reconfigurable fabric architecture. For example, each of four FPGA chips may contain one of the configurable very long instruction word (CVLIW) control modules 106 (also referred to as CVLIW controller 106) and one of the SIMD processing element cell and reconfigurable control and communication fabric (SPEC&RCCF) modules 108. Two such FPGA chips 102 and 104 are illustrated in FIG. 4. FIG. 1 also shows the signal interfaces between modules, which may be defined as follows.

Host 110 may send an FPGA control word 112 that may include data block length, start address, and accelerator function. Each CVLIW application control flow may be hardwired (programmed in CVLIW control modules 106) and executed with instruction pointer using a functional slot in FPGA control. The subsequent words may be all data words 112b on the I/O interface 114. I/O interface 114 is also shown in FIG. 2, where it is designated "u". The data word 112b is designated as data(u) and the instruction word 112a as inst(u). The CVLIW 106 is configurable in the sense that all CVLIWs 106 may be synchronized to one accelerator function or multiple accelerator functions stated in inst(u), and the accelerator function or multiple accelerator functions may be executed within individual CVLIWs 106.

An example of a high level application may be given as follows. <A>=> FPGA function "A" executed on FPGA with sub-functions across multiple FPGAs. Each sub-function is executed by application control flow within an individual CVLIW 106. <A>, <B>, <C>=> FPGA three accelerator functions are executed simultaneously on three different FPGAs or on three hardware partitions within a single FPGA.

Figure 5A:
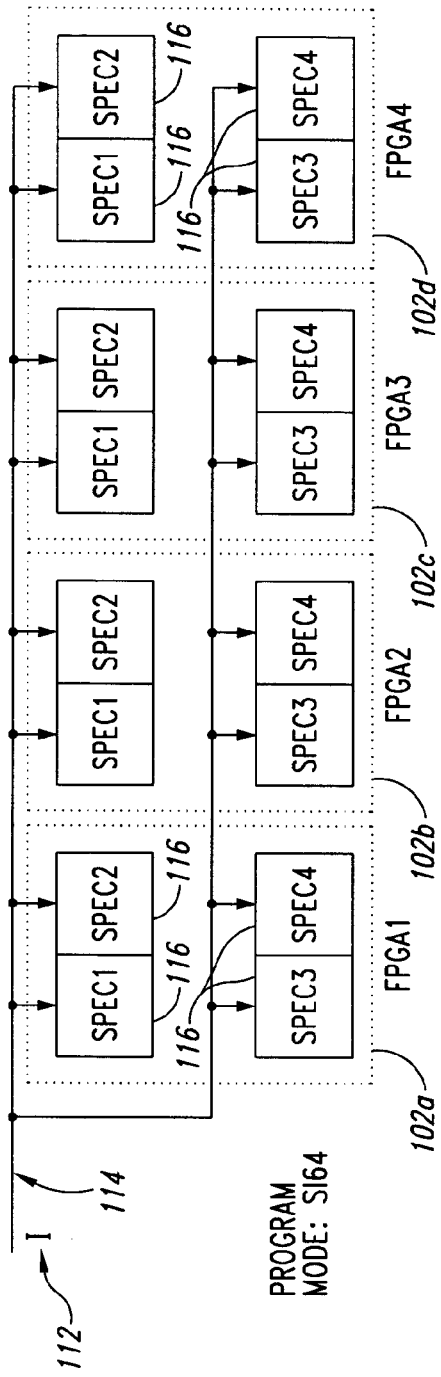
FIG. 5A is a system block diagram illustrating an example of interconnection of super-reconfigurable fabric computer architecture modules and instruction flow for SIMD programming in accordance with an embodiment of the present invention.
Figure 5B:
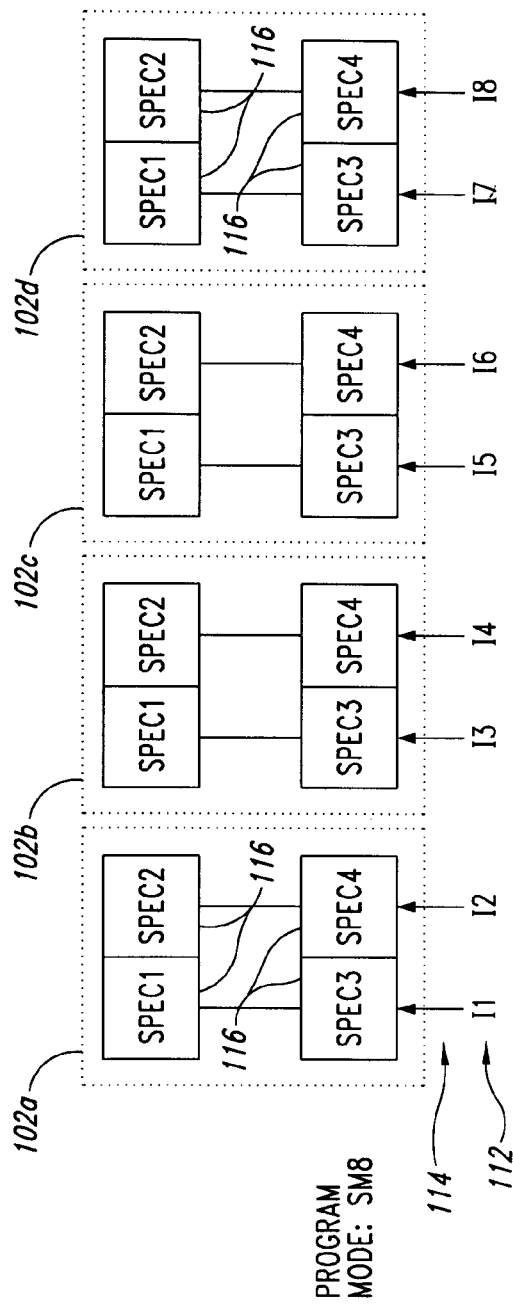
FIG. 5B is a system block diagram illustrating an example of interconnection of super-reconfigurable fabric computer architecture modules and instruction flow for multiple SIMD programming in accordance with an embodiment of the present invention.

FPGA control word 112 may include a data pointer, block count, and mode and may be denoted as: FPGA control=> (data pointer, block count, mode). Mode component of FPGA control word 112 may determine the above options,— e.g., function "A" executed on FPGA with sub-functions across multiple FPGAs or three accelerator functions are executed simultaneously on three different FPGAs—and may also determine how each CVLIW 106 controls the processing arrays as SIMD or MSIMD, as illustrated by the examples shown in FIGS. 5A and 5B. FIG. 5A shows, for example, an SIMD topology of control word flow for FPGA control word 112 (denoted "I" in FIG. 5A) on I/O interface 114, and also shows an exemplary distribution of SIMD processing element cells (SPEC)s 116 among multiple FPGAs 102a, 102b, 102c, and 102d. Similarly, FIG. 5B shows, for example, an MSIMD topology of control word flow for FPGA control words 112 (denoted "I1" through "I8" in FIG. 5B) on I/O interface 114, and also shows an exemplary distribution of SIMD processing element cells (SPEC)s 116 among multiple FPGAs 102a, 102b, 102c, and 102d.

Many programming modes are possible depending on how the CVLIWs 106 are configured. For example, an SIMD mode using 64 processing elements (PEs)—such as PEs 119—with four chips may be denoted SI64 and other modes SI16, SI32, and so on may be similarly defined. An MSIMD mode SM8 may have 8 MSIMD streams using 64 PEs mapped onto 4 chips. A mixed SIMD/VLIW mode may program floating point units (FPU)—such as FPUs 130— and fine grain reconfigurable cells (FGRC)—such as FGRCs 117—as VLIW resources supporting SIMD PE arrays. Each SPEC 116 may be described as a cell including a 2×2 array of simple n-bit coarse-grain processing elements 119. Each PE 119 can execute, for example, arithmetic and logic unit (ALU) operations, shift operations, complex multiplication, and multiply-accumulate (MAC) type of operations. A PE 119 can communicate to another PE 119 through their I/O ports and passing through reconfigurable control and communication fabric (RCCF) 118. Each cell or SPEC 116 may have a single-precision, IEEE compliant floating-point unit FPU 130 shared by PEs 119 within that cell or SPEC 116. To achieve high throughput in FPU sharing, the FPUs 130 may be pipelined to execute on PE streams within a cell. As shown in FIG. 1, a super-reconfigurable fabric architecture system 100 on a single chip may consist of four cells, providing a cluster-based organization of simple and powerful reconfigurable processing elements with built-in high-speed input/output connectivity.

Figure 3:
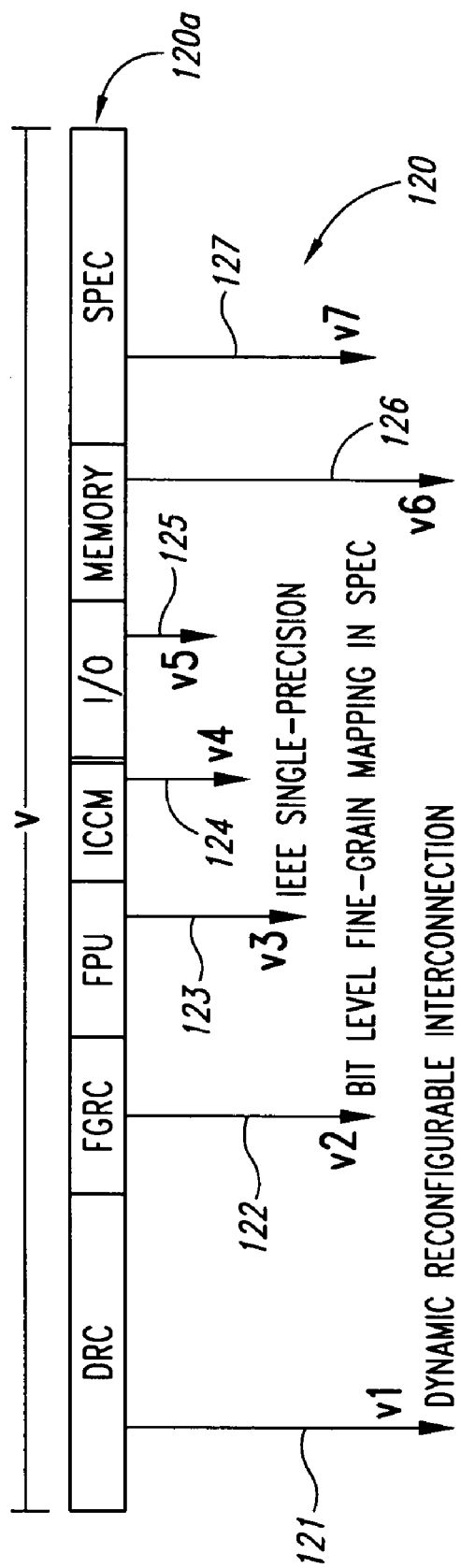
FIG. 3 is an information map diagram of a very long instruction word for super-reconfigurable fabric computer architecture in accordance with one embodiment of the present invention.

Signal interfaces for reconfigurable control and communication fabric RCCF 118 may be implemented as shown in FIG. 2. The "v" interface 120 may be output by CVLIW control modules 106 as shown in FIG. 3. For example, instruction word inst(u) 112a, which may be passed to CVLIW control modules 106 over I/O interface 114, may be a pointer to very long instruction word (VLIW) 120a. Various interfaces 121 through 127 of very long instruction word 120a may be passed over interface 120, as shown in FIGS. 1 through 4, from CVLIW control modules 106 to various modules, for example, of the SPEC&RCCF modules 108, which may include RCCF 118 and SPEC 116.

For example, interface 121, labeled "v1", from dynamic reconfigurable cell (DRC) portion of VLIW 120a may provide dynamic reconfigurable interconnection control to SPECs 116. Interface 122, labeled "v2", from fine grain reconfigurable cell (FGRC) portion of VLIW 120a may provide bit level fine grain mapping in the SPEC 116, which may include a fine grain reconfigurable cell 117 and multiple processing elements, PEs 119. Interface 123, labeled "v3", from floating point unit (FPU) portion of VLIW 120a may provide IEEE single-precision arithmetic control to FPUs 130. Interface 124, labeled "v4", from inter-chip communication module (ICCM) portion of VLIW 120a may provide communication control instructions for inter-chip communication modules 132. ICCMs 132 may be included, for example, in RCCFs 118 (see FIGS. 2 and 4) or SPEC & RCCFs 108 (see FIGS. 1 and 4). Interface 125, labeled "v5", from input/output (I/O) portion of VLIW 120a may provide instructions for I/O controllers 134. I/O controllers 134 may also be included, for example, in RCCFs 118 or SPEC & RCCFs 108. Interface 126, labeled "v6", from memory portion of VLIW 120a may provide instructions for data random access memory (RAM) controllers 136, local RAM controllers 138, and PE memory controllers 140 (see FIG. 4). Data RAM controllers 136, local RAM controllers 138, and PE memory controllers 140 may be included, for example, in RCCFs 118 or SPEC & RCCFs 108. Interface 127, labeled "v7", from SPEC portion of VLIW 120a may provide processing instructions to SPECs 116.

RCCFs 118 may include a number of other interfaces as seen in FIGS. 2 and 4. RCCFs 118 may include a processor generated address and data interface for processor referred to as "pad" 142. RCCFs 118 may include an interface from I/O controller and SPEC referred to as "pcd" 144. RCCFs 118 may include a data interface for floating point unit referred to as "fd" 146. RCCFs 118 may include a memory controller interface to on-board memory 150 referred to as "mc" 148. RCCFs 118 may include a memory control/address/data interface to SDRAM data memory 152 referred to as "mcad1" 153. RCCFs 118 may include a memory control/address/data interface to SSRAM local RAM 154 referred to as "mcad2" 155. RCCFs 118 may include a memory control/address/data interface to on-chip PE local memory 156 referred to as "mcad3" 157.

Figure 9:
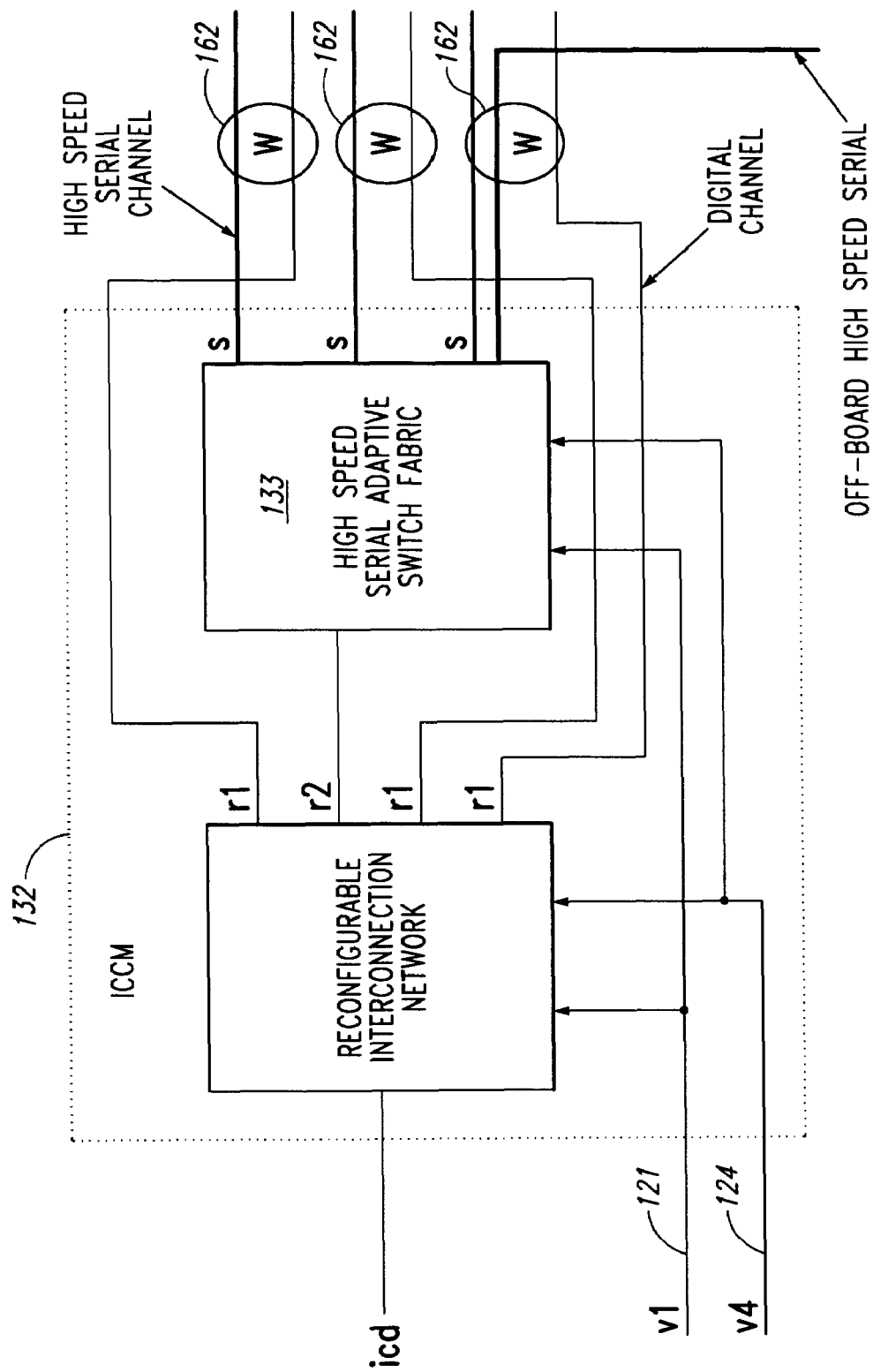
FIG. 9 is a system block diagram showing detail for an example implementation for an inter-chip communication module (ICCM) as shown in FIG. 4.

RCCFs 118 may include an I/O controller-control interface between SPECs 116 and memory controllers 140, 136, and 138. RCCFs 118 may include a control/data interface between I/O controllers 134 and SDRAM controllers 138 and 136 referred to as "cd" 158. RCCF 118 may include a common bus to the PE memory controller 140 "mcd" 158a. RCCF 118 may also include a single chip data entry point connection from I/O controller 134 to the ICCM via "icd" 158b. SPECs 116 may include a fine-grain reconfigurable cell (FGRC) controller-control interface 160 for the fine-grain reconfigurable cell 117 within each SPEC 116. Super-reconfigurable fabric architecture—such as that embodied by system 100—may include a reconfigurable inter-chip interconnection referred to as "w" 162. Reconfigurable inter-chip interconnection w 162 may be provided by inter-chip communication module ICCM 132 (see FIGS. 1, 2, 4, and 9). Reconfigurable inter-chip interconnection w 162 may provide closely coupled inter-PE communication from chip to chip, board to board and system to system, for example, between PEs 119, FPGA chips 102, FPGA chips 102 on separate boards, or from a first system 100 to a second system 100. Reconfigurable switch fabric, e.g., high-speed serial adaptive switch fabric 133, shown in FIG. 9, may be controlled by v1 121 and v4 124, which have been described above.

In summary, reconfigurable communication and control fabric 118 may be implemented with fine-grain FPGA architecture. Each cluster, e.g., SPEC 116 may be connected to its neighbor through RCCF 118. RCCF 118 may control the data path unit of cell PEs 119. The physical layer of the interconnection to the outside world may be a configurable layer of various emerging high-speed interconnection technologies built into RCCF 118. RCCF 118 may also be an entry point for processing elements, e.g., PEs 119, within a single chip in a multi-chip single board solution. A super scalar may be used for dynamic reconfigurable operations in the fine-grain RCCF 118. The super scalar operations may be performed at the second level of the architecture and pointed to by reconfigurable code within the VLIW control word 120a. The dynamic status of the processors, e.g., PEs 119, and hardware execution in run-time for these issued instructions, e.g., VLIW control words 120a, may be used to schedule and complete the reconfiguration in run-time. The primitive management directions given in the VLIW control, e.g., VLIW control words 120a and interfaces 120, may manage the run-time. The compiler may set up a static scheduling of the states-gathering and decision-making supervision, which may be provided to the super scalar engine, e.g., CVLIW 106, during its operation in run-time.

Thus, super-reconfigurable fabric architecture control may be achieved through a unique configurable VLIW controller, e.g., CVLIW 106. For example, the control algorithm for each functional operation ("op") code, e.g., accelerator function, may be embedded into CVLIW 106 and the instruction word, e.g., VLIW 120a, points to the selected "accelerator function". The instruction word 120a may have slots for SIMD/MSIMD selection, e.g., interfaces v1 121 and v4 124, the data block length, and the beginning address of data block. The data width may be configurable from 8, 16, 32 and 64-bits. CVLIW controllers 106 can emit several types of controls, including: program control, memory control, data path configuration control, and I/O control. A configuration memory, e.g., PE local memory 156, may be built into RCCF 118 for configuration of data path widths, pipeline stages within PE, e.g., PEs 119, and also for RCCF self-reconfiguring its interconnections, for example, to its own SPECs 116 or to other RCCFs 118.

FIG. 6 illustrates exemplary virtual bus interface signals 163 that may be provided, for example, between virtual bus interface (VBI) 164 (see FIGS. 4, 7, and 10) and RAM controllers 136, 138 and I/O controller 134 (see FIG. 4). Operation of virtual bus interface signals 163 is shown in more detail in FIGS. 7, 8, and 10.

Figure 7:
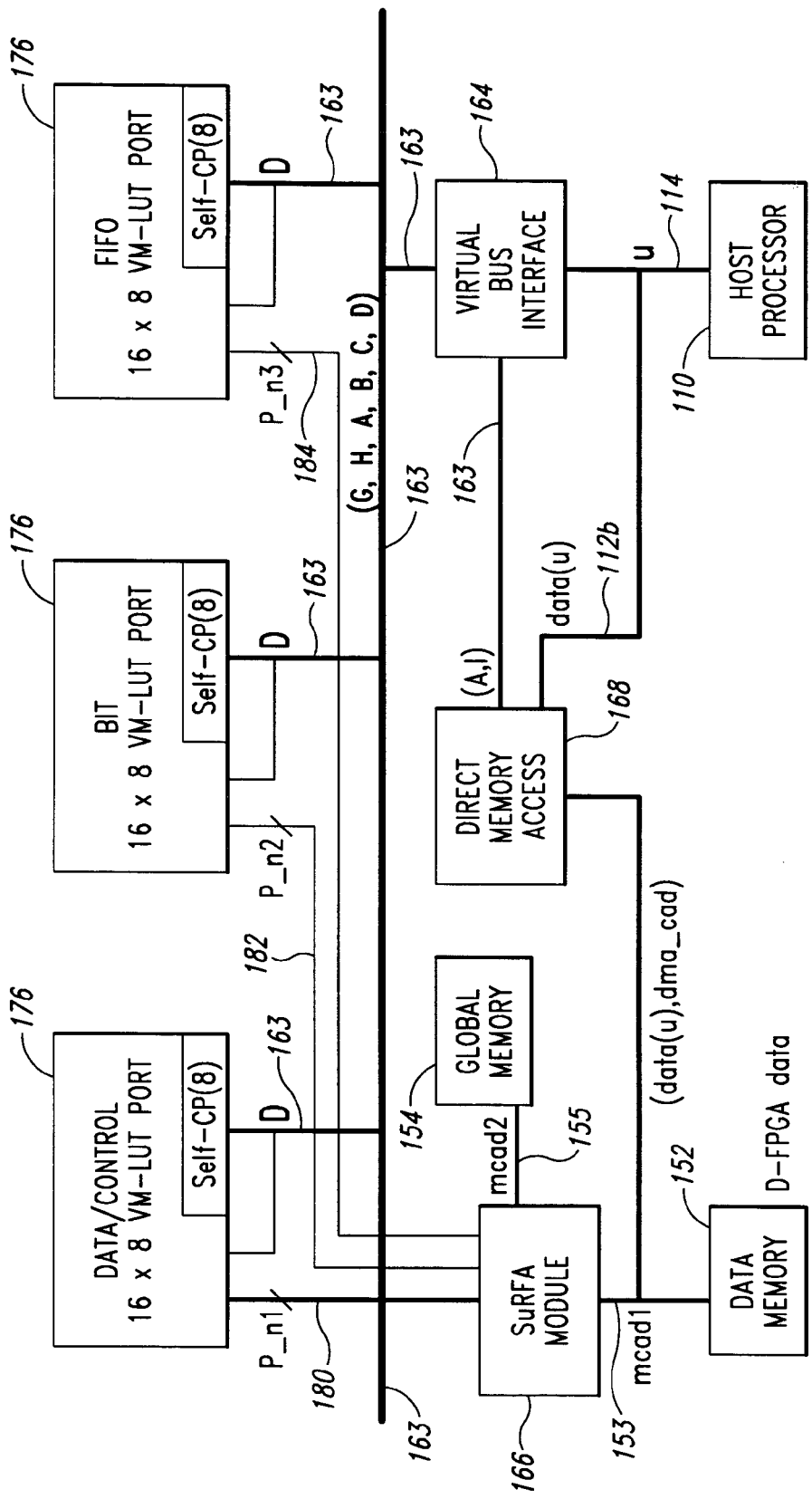
FIG. 7 is a system block diagram illustrating an example of interfaces between a virtual bus interface and a super-reconfigurable fabric computer architecture module in accordance with one embodiment of the present invention.

FIG. 7 shows exemplary interfaces between virtual bus interface VBI 164 and super-reconfigurable fabric architecture—such as a super-reconfigurable fabric architecture module 166. Super-reconfigurable fabric architecture module 166 may be implemented, for example, as FPGA 102 as shown in FIG. 4 and may include SPEC 116, CVLIW controller 106, and RCCF 118. Direct memory access 168 may permit direct access of memory by the host 110, bypassing the FPGA memory controller (e.g., PE memory controller 140) and without using the super-reconfigurable fabric architecture module 166. FIG. 7 shows an example of virtual memory (VM) ports 176. From an application within FPGA point of view, each VM port 176 may be a look-up table (LUT), hence the designation as VM-LUT ports 176. The granularity of data width for memory ports may be 8-bits, as in the example shown. Each 8-bit port 176 may be implemented with a 16×8 distributed RAM 177 (see FIG. 8) of which one location is used for data mapping and the rest for storing data self-processing results.

Figure 8:
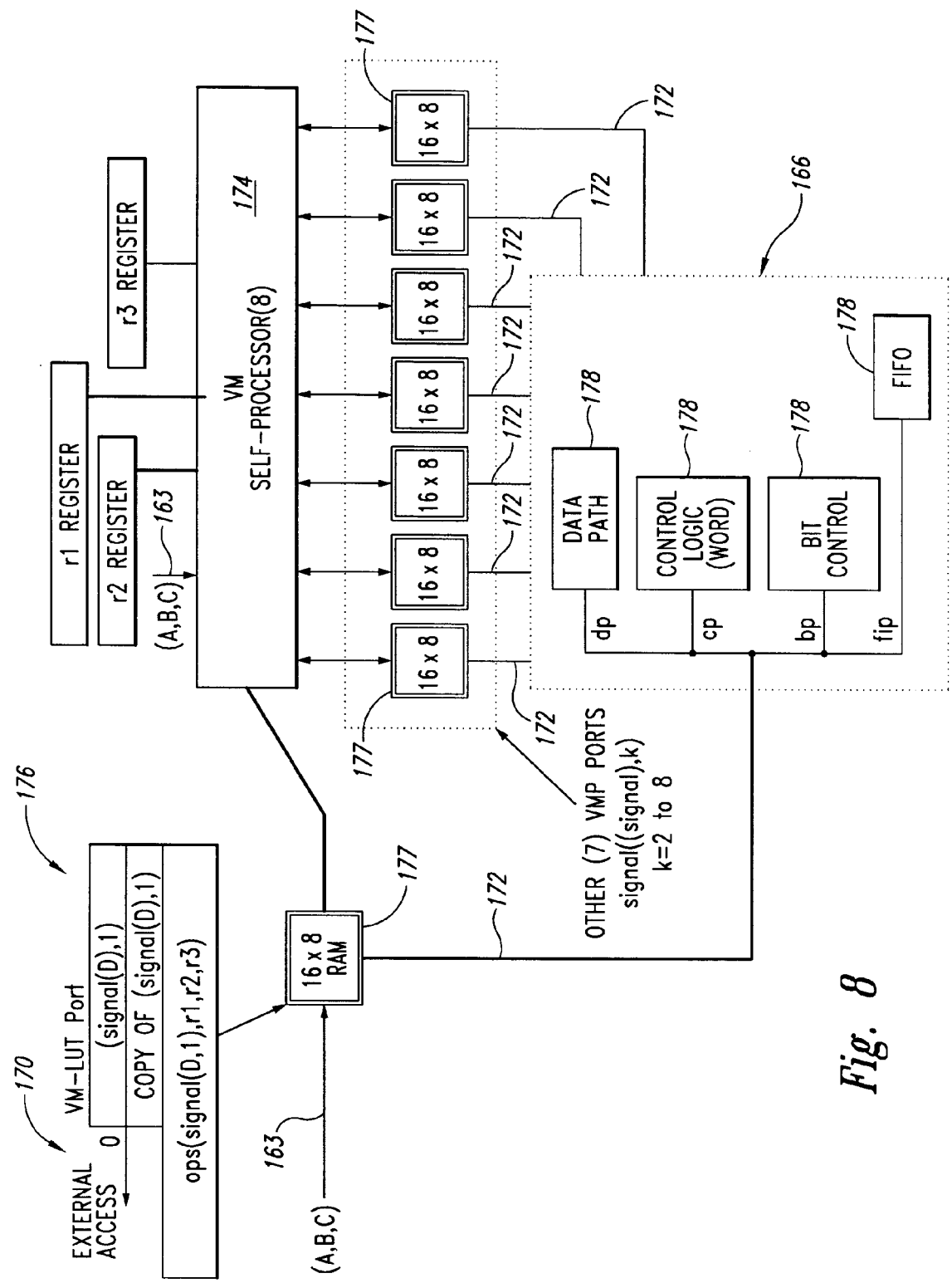
FIG. 8 is a system block diagram illustrating an example of a single generic self-processing interface for virtual memory for super-reconfigurable fabric computer architecture in accordance with an embodiment of the present invention.

FIG. 8 shows a signal generic self-processing interface 170 for virtual memory. Port signals 172 can be of type "data", "control", specific interface to on-chip data FIFO ("fifo"), or "bit". Each port signal type may have a self-processor 174. Each self-processor 174 can, for example, perform distinct operations on data that are useful for general signal and image processing applications and store the processed data in memory 177 locations attached to each port 176. For illustrative purposes, eight self-processors 174 are shown in FIG. 8. The eight self-processors 174 map, for example, a 64-bit word onto eight 8-bit ports 176 with eight 8-bit self-processors 174 for processing data on each port 176. Each type of port (data, control, fifo, and bit) may be glued to application logic 178 as illustrated in FIG. 8, where "dp" indicates a data port, "cp" indicates a control port, "bp" indicates a bit port, and "fip" indicates a fifo port. P_n1 180, P_n2 182, P_n3 184 may be used to designate the number of port signals on each type of port 176, as shown in FIG. 7. For example, for mapping a 64-bit FPGA data word 112b onto eight 8-bit ports 176 may require a 256-bit port configuration with its configuration as follows: four 64-bit ports (Long), or eight 32-bit ports (Half), or sixteen 16-bit ports (Short), or thirty-two 8-bit ports (Byte).

In summary, virtual bus interface 164 may be used to map standard bus protocol to a virtual bus, e.g., virtual bus interface signals 163. Virtual memory ports 176 may communicate via virtual bus signals 163 and map data, e.g., data word data(u) 112b, in and out from the host platform 110. All application ports, e.g., application logic 178, are glued to the virtual memory ports 176 and the glue is highly configurable.

Figure 11:
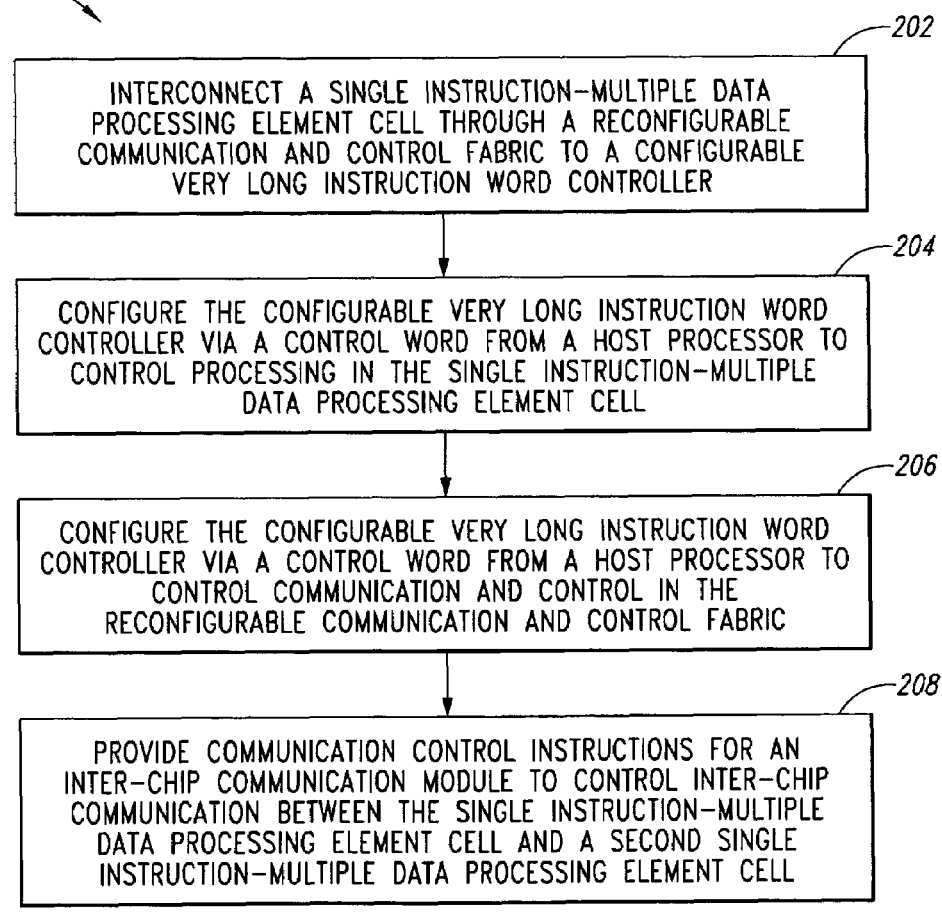
FIG. 11 is a flowchart of a method for multiple data computer processing in accordance with one embodiment of the present invention.

FIG. 11 illustrates method 200 for multiple data, parallel computer processing in accordance with one embodiment of the present invention. Operation 202 may include interconnect a single instruction-multiple data processing element cell—such as SPEC 116—through a reconfigurable communication and control fabric—such as RCCF 118—to a configurable very long instruction word controller—such as CVLIW controller 106.

Operation 204 may include configuring the configurable very long instruction word controller—such as CVLIW controller 106—via a control word from a host processor—such as control word 112 from host 110—to control processing in the single instruction-multiple data processing element cell—such as SPEC 116. Operation 204 may further include controlling a plurality of simple n-bit coarse-grain processing elements—such as PEs 119—in the single instruction-multiple data processing element cell SPEC 116. Operation 204 may further include controlling a fine grain reconfigurable cell—such as FGRC 117 in the single instruction-multiple data processing element cell SPEC 116.

Operation 206 may include configuring the configurable very long instruction word controller—such as CVLIW controller 106—via a control word from a host processor—such as control word 112 from host 110—to control communication and control in the reconfigurable communication and control fabric—such as RCCF 118 or SPEC & RCCF modules 108.

Operation 208 may include providing communication control instructions for an inter-chip communication module—such as ICCM 132—to control inter-chip communication between the single instruction-multiple data processing element cell—such as SPEC 116 on FPGA 102—and a second single instruction-multiple data processing element cell—such as SPEC 116 on FPGA 104.

It should be understood, of course, that the foregoing relates to exemplary embodiments of the invention and that modifications may be made without departing from the spirit and scope of the invention as set forth in the following claims.

I claim:

1. A system comprising:
a super reconfigurable fabric architecture module, comprising:
a configurable very long instruction word controller that receives a control word from a host processor over a standard I/O bus;
a reconfigurable communication and control fabric having a very long instruction word interface to said configurable very long instruction word controller; and
a single instruction-multiple data processing element cell controlled by said configurable very long instruction word controller through said reconfigurable communication and control fabric via said very long instruction word interface; and
a virtual bus interface to the super reconfigurable fabric architecture module, wherein the virtual bus interface comprises:
a virtual memory port that maps a standard bus protocol to virtual bus interface signals provided between said virtual bus interface and the super reconfigurable fabric architecture module, wherein said virtual memory port provides a port signal having a type chosen from "data", "control", "fifo", or "bit", wherein each port signal type has a self-processor that performs distinct operations producing processed data, and wherein said processed data is stored in a memory location attached to said virtual memory port.

2. The system of claim 1, wherein said single instruction-multiple data processing element cell further comprises:
a coarse grain reconfigurable processing element connected through said very long instruction word interface to said reconfigurable communication and control fabric.

3. The system of claim 1, wherein said single instruction-multiple data processing element cell further comprises:
a fine grain reconfigurable cell connected through said very long instruction word interface to said reconfigurable communication and control fabric.

4. The system of claim 1, wherein said single instruction-multiple data processing element cell further comprises:
a fine grain reconfigurable cell connected through said very long instruction word interface to said reconfigurable communication and control fabric; and
a coarse grain reconfigurable processing element connected through a fine-grain reconfigurable controller interface to said fine grain reconfigurable cell.

5. The system of claim 1, wherein the reconfigurable communication and control fabric further comprises:
an interface to a single instruction-multiple data processing element cell;
an interface to a floating-point unit;
an inter-chip communication module with a "v4" interface to the configurable very long instruction word controller;
a data memory controller having a "v6" interface to the configurable very long instruction word controller; and
an I/O controller with a "cd" interface to said data memory controller, an "icd" interface to said inter-chip communication module, and a "v5" interface to the configurable very long instruction word controller.

6. The system of claim 5, further comprising:
a "pcd" interface between said I/O controller and the single instruction-multiple data processing element cell.

7. The system of claim 5, further comprising:
a processing element memory controller with a "pad" interface to the single instruction-multiple data processing element cell and an "mcd" interface to said I/O controller.

8. The system of claim 5, wherein said I/O controller has an "fd" interface to the floating-point unit.

9. The system of claim 1, wherein the single instruction-multiple data processing element cell further comprises:
a plurality of processing elements; and
a fine grain reconfigurable cell having a fine grain reconfigurable cell controller interface to each of said plurality of processing elements.

10. The system of claim 9, wherein said fine grain reconfigurable cell has a "v2" interface that receives a fine grain reconfigurable cell portion of a very long instruction word.

11. The system of claim 9, wherein said fine grain reconfigurable cell is implemented by a field programmable gate array.

12. The system of claim 9, wherein said plurality of processing elements are configured as a 2×2 array of n-bit coarse-grain processing elements that communicate through their I/O ports and passing through a reconfigurable control and communication fabric.

13. The system of claim 1, wherein said virtual memory port is glued to an application logic according to the port signal type of said virtual memory port.

14. The system of claim 1, wherein said self-processor includes a look-up table.

15. A field programmable gate array comprising:
a virtual bus interface that receives a control word from a host processor over a standard I/O bus;
a super reconfigurable fabric architecture module, comprising:
a configurable very long instruction word controller that receives said control word via virtual bus interface signals from said virtual bus interface;
a reconfigurable communication and control fabric wherein said configurable very long instruction word controller has a very long instruction word interface "v" with said reconfigurable communication and control fabric; and
a single instruction-multiple data processing element cell controlled by said configurable very long instruction word controller through said reconfigurable communication and control fabric via said very long instruction word interface "v"; and
wherein the virtual bus interface comprises:
a virtual memory port that maps a standard bus protocol to virtual bus interface signals provided between said virtual bus interface and the super reconfigurable fabric architecture module, wherein said virtual memory port provides a port signal having one of a plurality of port signal types, wherein each port signal type has a self-processor that performs distinct operations producing processed data, and wherein said processed data is stored in a memory location attached to said virtual memory port.

16. The field programmable gate array of claim 15, wherein said reconfigurable communication and control fabric further comprises an inter-chip communication module wherein said configurable very long instruction word controller has a very long instruction word interface "v4" with said inter-chip communication module.

17. The field programmable gate array of claim 15, wherein said single instruction-multiple data processing element cell further comprises:
a fine grain reconfigurable cell wherein said configurable very long instruction word controller has a very long instruction word interface "v2" with said fine grain reconfigurable cell.

18. The field programmable gate array of claim 15, wherein said field programmable gate array is configured in a single instruction-multiple data program mode using said very long instruction word interface "v".

19. The field programmable gate array of claim 15, wherein said field programmable gate array is configured in a multiple single instruction-multiple data program mode using said very long instruction word interface "v".

20. A method for operating a super reconfigurable fabric architecture module to perform parallel processing, the method comprising operations of:
interconnecting a single instruction-multiple data processing element cell through a reconfigurable communication and control fabric to a configurable very long instruction word controller;
configuring said configurable very long instruction word controller via a control word from a host processor wherein: said configurable very long instruction word controller controls processing in said single instruction-multiple data processing element cell; and said configurable very long instruction word controller controls communication and control in said reconfigurable communication and control fabric;
providing a virtual bus interface to the super reconfigurable fabric architecture module, wherein the virtual bus interface comprises: a virtual memory port;
mapping, via said virtual memory port, a standard bus protocol to virtual bus interface signals provided between said virtual bus interface and the super reconfigurable fabric architecture module;
providing a port signal having one of a plurality of port signal types from said virtual memory port, wherein each port signal type has a self-processor that performs distinct operations producing processed data; and
storing said processed data in a memory location attached to said virtual memory port.

21. The method of claim 20, wherein said configuring operation further comprises controlling a plurality of n-bit coarse-grain processing elements in said single instruction-multiple data processing element cell.

22. The method of claim 20, wherein said configuring operation further comprises controlling fine grain reconfigurable cell in said single instruction-multiple data processing element cell.

23. The method of claim 20, further including an operation of providing communication control instructions from said configurable very long instruction word controller for an inter-chip communication module included in said reconfigurable communication and control fabric, wherein said inter-chip communication module controls inter-chip communication between said single instruction-multiple data processing element cell and a second single instruction-multiple data processing element cell.

* * * * *